Figure 1:
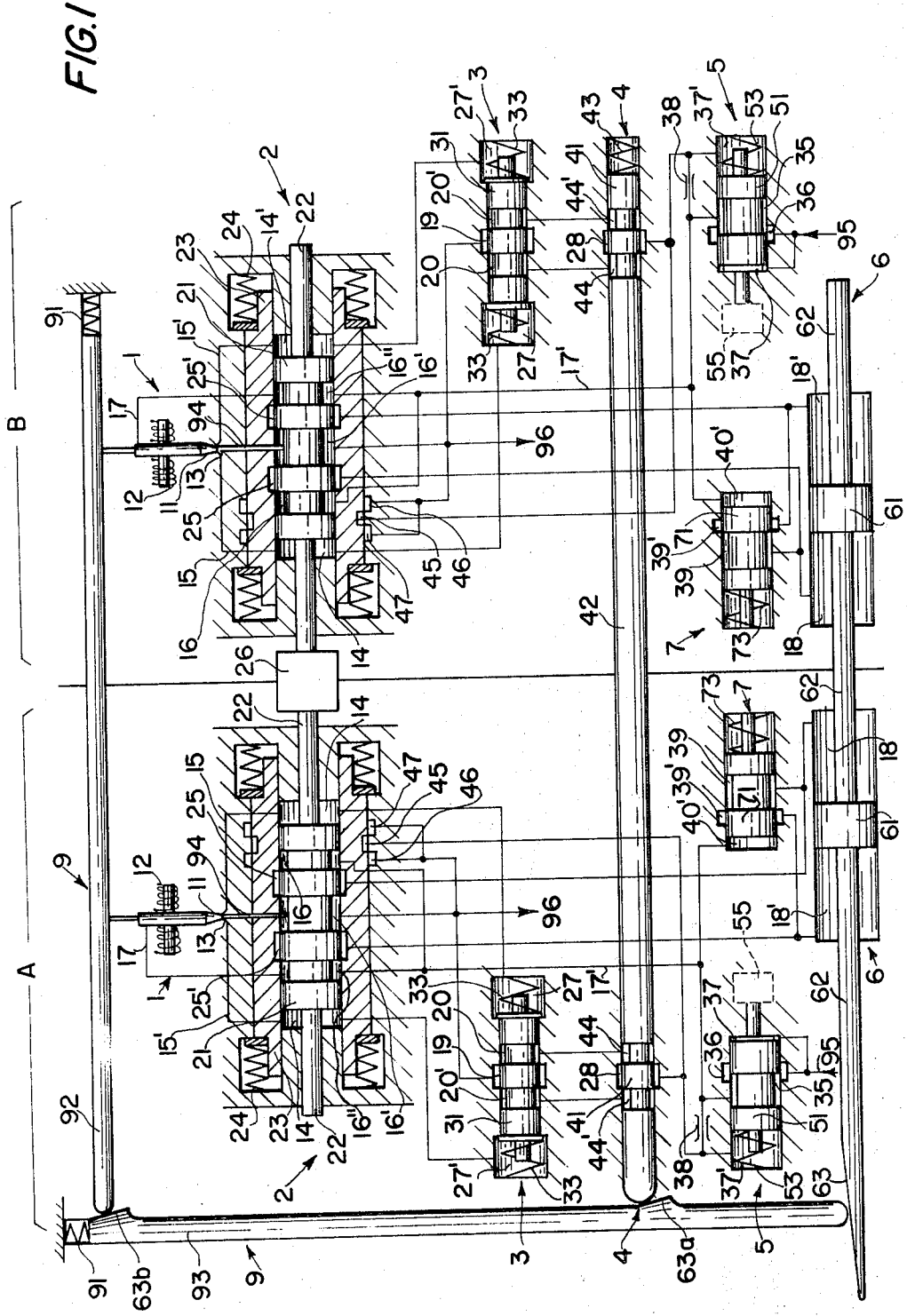

United States Patent

Hedermann

[11] 3,837,262
[45] Sept. 24, 1974

[54] REDUNDANT ELECTROHYDRAULIC REGULATING UNIT

[75] Inventor: Dieter Hedermann, Immenstaad, Germany

[73] Assignee: Dornier A.G., Friedrichshafen/Bodensel, Germany

[22] Filed: Nov. 10, 1972

[21] Appl. No.: 305,321

Related U.S. Application Data

[63] Continuation-in-part of Ser. No. 115,968, Feb. 17, 1971, abandoned.

[30] Foreign Application Priority Data

Mar. 26, 1970 Germany.............................. 2014661

[52] U.S. Cl..................... 91/365, 91/411 A, 91/451
[51] Int. Cl............................................ F15b 13/16
[58] Field of Search ..... 91/363 A, 451, 452, 411 A, 91/365

[56] References Cited
UNITED STATES PATENTS

| | | | |
|---|---|---|---|
| 3,338,139 | 8/1967 | Wood................................ | 91/363 A |
| 3,540,350 | 11/1970 | Heine................................ | 91/363 A |

*Primary Examiner*—Paul E. Maslousky
*Attorney, Agent, or Firm*—James E. Bryan, Esquire

[57] ABSTRACT

This invention relates to a redundant electrohydraulic regulating system for actuating control surfaces, rudders and the like of aircraft, the input signals of which are transmitted electrically by the pilot and by means of regulating and/or stabilizing devices, comprising, at least two servo chains or chains of regulating units, for purposes of detecting errors and/or malfunctions of one of the servo chains and preventing the inoperative servo chain from affecting the operation of the operative chain, each of the servo chains including, a servro or preliminary control valve; a main control valve, whose distributing slide valve is displaced or shifted in response to the operation of the servo or premilinary control valve; a fluid motor, which is displaced or moved by a pressure medium whose pressure is controlled by movements of the distributing slide valve of the main control valve; a position valve, whose distributing slide valve is mechanically coupled to the piston of the fluid motor and a differential pressure valve, which is actuated by the servo or preliminary control valve and, in conjunction with the position valve, interrupts the supply of pressure medium to the pressure chambers of the fluid motor of a faulty servo chain.

5 Claims, 2 Drawing Figures

REDUNDANT ELECTROHYDRAULIC REGULATING UNIT

This application is a continuation-in-part of application Ser. No. 115,968 now abandoned, filed Feb. 17, 1971.

The present invention relates to a redundant electrohydraulic regulating system for actuating control surfaces, rudders or the like in aircraft, wherein at least two servo chains or chains of regulating units are provided for the purpose of detecting errors and each of the servo chains is provided with a servo or preliminary control valve actuatable by an electrical input signal being transmitted by the pilot and a regulating and/or stabilizing device.

In the aircraft art, regulating units make it possible to transmit electrically the switching signals for a rudder released by the pilot. Where such units are utilized, an effective detection of errors in case of a malfunction of a regulating unit is an absolute necessity. For safety reasons, several regulating units are therefore combined into a chain in order to make it possible to cover all of the disturbances that possibly may arise.

The regulating systems, known in the art, all operate on the basis of a "majority decision," i.e., three chains are needed for determining an error. In most systems, distributing slide valves are not interconnected, but suitable synchronizing devices are present therein.

Equally known in the art is another arrangement of regulating units in which only one chain operates initially and switching-over to the second chain is effected when an error occurs. In systems having connected distributing slide valves, the latter are either rigidly connected, or the individual slide valve parts are coupled by way of levers and connecting rods. A disadvantage of the aforementioned systems is that complicated structural components must be included therein for each chain. Where distributing slide valves with a mechanical connection, i.e. a rigid slide valve rod, are utilized in several chains, the housings have a greater structural length and the manufacture thereof involves difficulties. In the case of the jamming of only one slide valve, the entire installation is blocked and unusable. Those skilled in the art therefore proceeded to separate the housings of the individual servo valves and to connect them by means of fluid lines. This, in turn, involves the disadvantage that hydraulic lines tend to develop leakages and may fail completely even after minor vibrations or shocks.

The present invention provides for a redundant electrohydraulic regulating system which is adapted tO operate a small number of electrical structural units, thus permitting a simplification of the entire system. A further advantage of the present invention is the separation of housings. By having the structural components of different hydraulic systems in separate housings, in case of a housing flaw, only one hydraulic system will break down where the others will not be affected thereby. The regulating system of the present invention is further intended to satisfy the requirement that the jamming of one of the distributing slide valves of several servo stages will not automatically result in an impairment of the other distributing slide valves.

Bearing in mind these requirements that are to be met by regulating systems, the desirable features of the present invention are obtained by providing at least two servo chains in which each of the servo chains includes one servo or preliminary control valve, a main control valve, whose distributing slide valve is displaced or shifted in response to the servo or preliminary control valve; a fluid motor, which is displaced or shifted by a pressure medium whose pressure is controlled by movements of the distributing slide valve of the main control valve; a position valve, whose distributing slide valve is mechanically coupled to the piston of the fluid motor; and a differential pressure valve, which is actuated by the servo or preliminary control valve and, in conjunction with the position valve, interrupts the supply of pressure medium to the pressure chambers of the fluid motor of a faulty servo chain. As a result thereof, the detection of an error is achieved in a simple manner without more than two chains being necessary for that purpose. In an arrangement comprising three chains, even two simultaneously arising errors are covered.

Figure 2:
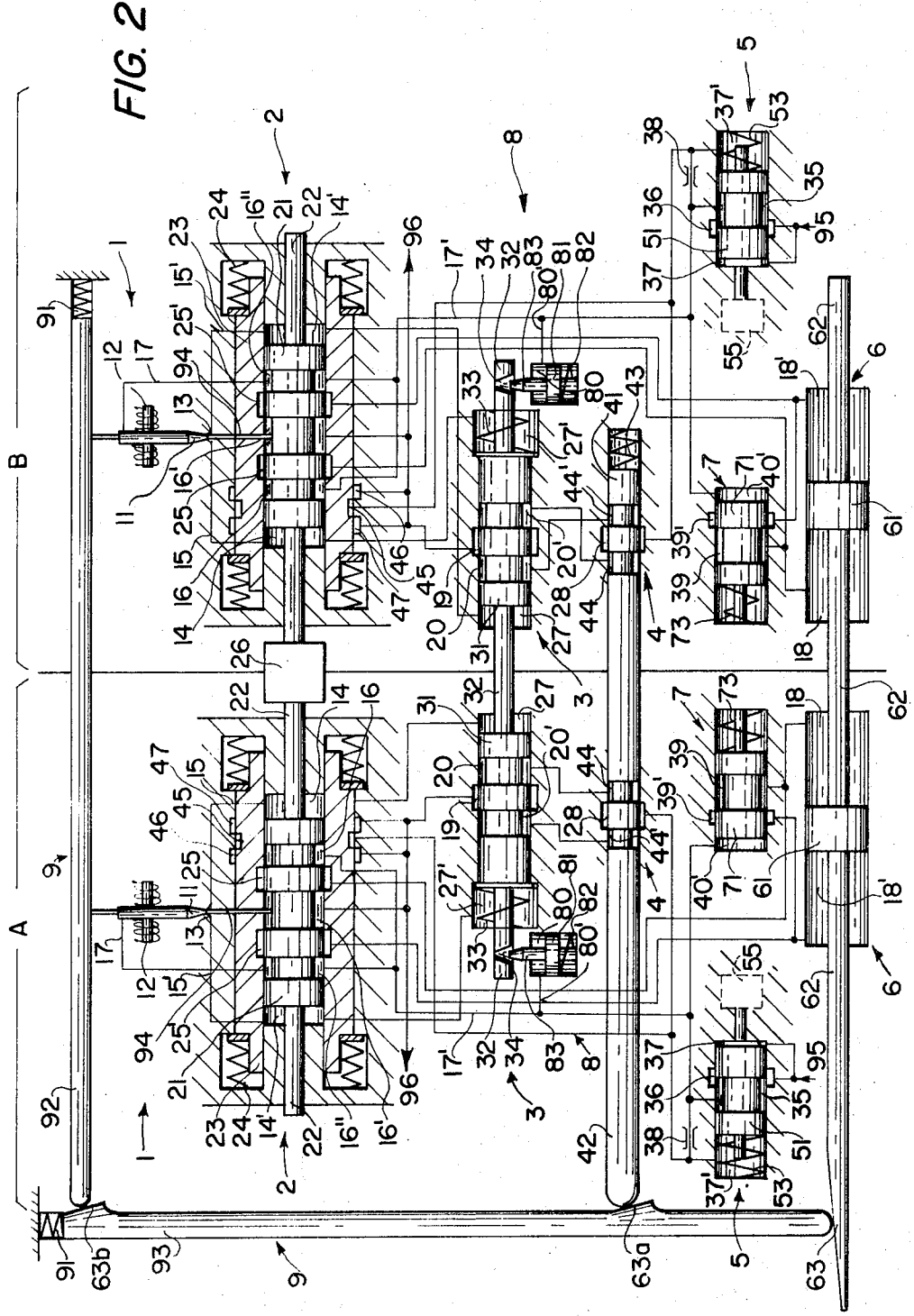

Two embodiments according to the present invention are illustrated in the drawings, in which:

FIG. 1 is a schematic illustration of the redundant electrohydraulic regulating system of the present invention, and FIG. 2 shows a construction according to FIG. 1 in which the differential pressure valves of two servo chains are interconnected.

The redundant electrohydraulic regulating device proposed by the present invention has been illustrated schematically in the drawings.

The regulating device consists of two servo chains A and B, each of which includes a plurality of identical regulating units. Each of the chains A and B includes a servo or preliminary control valve 1, a main control valve 2, a differential pressure valve 3, a position valve 4, a disconnecting valve 5, a bypass valve 7, and a fluid motor 6, as well as a mechanical return means 9 and 9'.

Like reference numerals have been used in the specification to identify the same parts of the control units of both servo chains A and B.

The preliminary control or servo valve 1 has a jet pipe 11 which is pivotal by means of a torque motor 12, from a neutral position or central position (as shown in the drawings), toward the left or toward the right. The torque motor 12 is actuated via electrical feed lines (not shown herein) by the pilot or a regulating or stabilizing device for purposes of displacing or shifting the fluid motor 6 by an electric impulse transmission. The jet pipe 11 is tranversed by a pressure medium supplied from a pressure source 95 and is provided with a jet nozzle Out of which flows the pressure medium. After flowing out of nozzle, the pressure medium jet impinges upon a hydraulic switch point 13 by means of which the pressure medium is conveyed (depending upon the position of the jet pipe 11) to a pressure line 15, or to a pressure line 15'. The main control valve 2 comprises a sliding sleeve 23 which is disposed within a stationary housing, axially moveable within the housing and centered in a central position by prestressed springs 24. Distributing slide valve 21 of the main control valve 2 is disposed in sliding sleeve 23 and is axially displaceable therein. Formed on both sides of the distributing slide valve 21 are pressure chambers 14 and 14', into which terminate the pressure lines 15 and 15', respectively, of the preliminary control or servo valve 1.

The distributing slide valve 21 of the main control valve 2 has annular grooves 16, 16' and 16'', which operatively coact with the counter-grooves 25 and 25' in the sliding sleeve 23. The afore-mentioned control grooves 16, 16', 16", and counter-grooves 25, 25' serve to feed the pressure medium supplied from the pressure source 95 to either one or the other of pressure chambers 18 and 18' of the fluid motor 6. The distributing slide valve 21 of the main control valve 2 of servo chains A and B are connecred with each other by means of a piston rod 22 and a coupling 26. This arrangement has the advantage that the sliding sleeves 23 of chains A and B need not be mounted in precise alignment on the longitudinal axis, and that the operation of the entire slide assembly is not impaired by an eccentric position of the slide valve 21 and the sliding sleeves 23 with respect to each other.

Coordinated with the main control valve 2 of each of chains A and B is a differential pressure valve 3 which comprises an axially displaceable slide valve 31 having control grooves 20 and 20'. The control grooves 20 and 20' cooperate with a control groove 19 in the stationary housing of the differential pressure valve 3. Inserted on both sides of the distributing slide valve 31 are compression springs 33. Compression springs 33 are supported against the housing, are prestressed and center the slide valve 31 in the central or neutral position thereof. In addition, the spaces or chambers 27 and 27' in which the springs 33 are mounted serve as pressure chambers. These pressure chambers are in constant communication with the pressure chambers 14 and 14', respectively, of the main control valve 2 by way of pressure lines.

Mounted between the differential pressure valve 3 and the pressure medium supply line 95 of both chains A and B is position valve 4. The distributing slide valve 41 of the position valve 4 of chain A is rigidly connected with the slide valve 41 of chain B by way of a piston rod 42. The slide valve 41 of the position valve 4 has control or switching grooves 44 and 44' which cooperate with a stationary counter control or switching groove 28, depending upon the displacement or shifting of the slide valve 41. The control or switching grooves 44 and 44' are in constant communication, by way of connecting lines, with the switching grooves 20 and 20', respectively, of the differential pressure valve 3.

Mounted between the pressure source 95 and the position valve 4 of each of the chains A and B is disconnecting valve 5 which includes a slide valve 51 with an annular groove 35. The annular groove 35 cooperates with an annular groove 36 disposed in the rigid housing; and, in the neutral position of the slide valve 51 (as shown in the drawings), the annular groove 36 is in constant engagement with the annular groove 35, and hence a free passage for the pressure medium from the pressure source 95 to the annular grooves 16 and 16" via the pressure line 17' is provided. By means of the control slide 21 of the main control valve 2, the pressure medium is fed to either one or the other pressure chambers 18 and 18' of the fluid motor 6 of chains A and B. Formed on both sides of the slide valve 51 are pressure chambers 37 and 37'. The pressure chamber 37 is in constant communication with the pressure source 95 and the pressure chamber 37' is in constant communication with the control or switching groove 16" of the main control valve 2. Mounted in the pressure chamber 37' is a prestressed compression spring 53 which is supported against the stationary housing and keeps the slide valve 51 in the neutral position shown in the drawings. Reference numeral 55 is used to identify an optical indicator which becomes automatically operative when an error arises.

Via the annular groove 35 of the disconnecting valve 5, the pressure source 95 is constantly connected to the annular groove 45 in the sliding sleeve 23. During a blockage between the slide valve 21 and the sliding sleeve 23 of the main control valve 2, depending upon the direction of the displacement of the sleeve 23 against the action of the springs 24, the control or switching groove 45 will communicate with either the stationary switching groove 46 or 47 in the stationary housing and establish, via the corresponding pressure lines, a connection to the return 96. In the neutral position of the sliding sleeve 23, shown in the drawing, the pressure medium cannot, however, pass to or arrive at the return 96. A throttle 38, the operation of which will be described hereinbelow, is mounted in the pressure medium line between the pressure chamber 37' and the switching groove 35.

Further coordinated to the fluid motor 6 of both chains A and B is a bypass valve 7. This bypass valve consists of a distributing slide valve 71 having a control or switching groove 39, which latter cooperates with a stationary switching groove 39'. Formed on one side of the slide valve 71 is a pressure chamber 40' which is in constant communication, via a corresponding pressure line, with both the switching groove 35 of the disconnecting valve 5 and, via the pressure line 17', with the switching grooves 16 and 16" of the main control valve 2. Provided on the side of the slide valve 71 which is opposite the pressure chamber 40' is a compression spring 73 with one end acting upon the piston 71 and, the other end supported against the stationary housing. In the neutral position (as shown in the drawings), the slide valve 71 is constantly kept in a position in which the switching grooves 39 and 39' do not communicate with each other. The bypass valve 7 has the task, in case of an interruption of the pressure medium supply from the pressure source 95 of interconnecting the pressure chamber 18 qnd 18' of the fluid motor 6 of chains A or B, and thus of preventing a blocking of the working position 61 due to the pressure medium being present in the pressure chambers 18 and 18'. The working piston 61 of chain A is connected with the working piston 61 of chain B by means of the piston rod 62.

A mechanical return system 9 and 9' is also provided, which is composed of a layer system 93 and 92. The rod 93 is positioned at right angle with respect to the piston rod 62 of the fluid motor 6 and is constantly kept in bearing contact with a wedge surface 63 of the piston rod 62 by means of a spring 91. The rod 93 further includes a wedge surface 63a with which the piston rod 42 of the position valve 4 is kept in constant bearing contact by means of preselected compression spring 43 supported against the stationary housing. The rod 93 includes yet another wedge surface 63b against which the rod 92 of the return 9' is constantly supported by means of a prestressed compression spring 91' mounted in the housing. The wedge surface 63 on the piston rod 62 of the fluid motor 6 and the wedge surface 63a on the rod 93 of the mechanical return 9 causes the slide valves 41 of both chain A and B to shift in synchronism with the movement of the working piston 61 of the fluid motor 6 due to the connection of the slide valves 41 by the piston rod 42. The same holds true for the rod 92 of the mechanical return 9'. The jet pipe 11 is conconnected, via an elastic member 94, with the slide valve 21 of the main control valve 2. This connection represents the interior return of the regulating units of the chain A and, respectively, of chain B. Further present is a pressure line 17 by way of which, jointly with the pressure line 17', pressure medium from the pressure source 95 is fed to the jet pipe 11.

The operation of the system described hereinabove will now be further explained by way of example.

Let it be assumed that the pilot transmits a control order or command for actuating the fluid motor 6 and the rudder, or other device connected thereto (not shown herein). Let it be further assumed that the preliminary control or servo valve 1 of chain A operates in accordance with the command given by the pilot, and that the preliminary control or servo valve 1 of chain B becomes inoperative due to an interruption of the current circuit or a failure of the torque motor 12. When, due to the control order of the pilot, the jet pipe 11 of the preliminary control or servo valve 1 of chain A is moved toward the right due to excitation of the winding of the torque motor 12, the pressure medium discharging from the nozzle of the jet pipe 11 flows, via the pressure line 15. To the pressure chamber 14 of the main control valve 2. Because of the pressure medium pressure being built up in the pressure chamber 14, and the coupling 26, the slide valve 21 of the main control valve 2 is moved toward the left in both chain A and chain B. Due to this displacement of the slide valve 21 the jet pipe 11 of chain B is carried along toward the left, via the interior return 94, and the pressure medium discharging from the jet pipe 11 passes, via the pressure line 15, into the pressure chamber 14 of the main control valve 2 of chain B. The pressure medium pressure in the pressure chamber 14 of the main control valve of chain A and the pressure medium pressure in the pressure chamber 14 of the main control valve 2 in chain B accordingly act upon their slide valve 21 in opposite directions. There will accordingly be built up in the pressure chamber 27 of the differential pressure valve 3 of both chains A and B a corresponding pressure medium pressure and the slide valve 31 of the differential pressure valve 3 of both chain A and chain B is displaced or shifted from the neutral position. Specifically, slide valves 31 of chains A and B will be shifted in opposite directions to one another against the action of the compression springs 33, which means that the slide valve 31 of chain A moves toward the left whereas the slide valve 31 of chain B moves toward the right. Due to the displacement or shifting of the slide valve 21 of chain A toward the left, the control or switching grooves 25, and 16 of the main control valve 2 are in communication with each other, and the pressure medium furnished by the pressure source 95 is fed toward the pressure chamber 18 of the fluid motor 6 of chain A, whereas the pressure chamber 18' of fluid motor 6 is connected with the return line 96 via the switching grooves 25' and 16'. The working piston 61 of the fluid motor 6 is therefore shifted toward the left. During this movement of the working piston 61, the piston rod 42 of the position valve 4 is moved, via the rod 93 of the mechanical return 9, toward the right in proportion to the movement of the working piston 61. In this position of the piston rod 42 of the position valve 4, the pressure medium from the pressure source 95 of chain A, via the switching groove 36 and the switching groove 35 of the disconnecting valve 5, to the switching grooves 28 and 44' of the position valve 4, and from there to the switching groove 20' of the ifferential pressure valve 3 of chain A. Since the slide valve 31 of this differential pressure valve 3 is displaced or shifted toward the left, the pressure medium cannot pass from the switching groove 20' to the return line 96 of chain A. By means of the presetresed compression spring 53 of the disconnecting valve 5 the slide valve 52 is kept in the neutral position shown in the drawing, and a free passage of the pressure medium from the pressure source 95 to the main control valve 2 of chain A is thereby assured. The bypass valve 7 of the chain A is at that time in the closed position thereof by reason of the action of the pressure medium in the presence chamber 40' on the slide valve 71 so that a connection between the pressure chambers 18 and 18' of the fluid motor 6 of chain A cannot take place.

In the case of faulty chain B, the slide valve 31 of the differential pressure valve 3 and the piston rod 42 of the position valve 4 are shifted toward the right. As a result thereof, the pressure medium being furnished by the pressure source 95 has free passage or discharge toward the return 96 of the chain B via the switching grooves 36 and 35 of the disconnecting valve 5, the switching grooves 28 and 44 of the position valve 4, and the switching grooves 20 and 19 of the differential pressure valve 3. Because of the throttling effect of the throttle valve 38, only a reduced pressure medium pressure can be built up in the pressure chamber 37' of disconnecting valve 5, as compared to the pressure medium pressure in the pressure chamber 37, so that the slide valve 51 of the disconnecting valve 5 is moved toward the right against the action of the compression spring 53 due to the full pressure medium pressure being built up in the pressure chamber 37. Therefore, the switching groove 36 is closed off, and no pressure medium can pass from the pressure source 95 to the main control valve 2 or to the return line 96. As a result of the closing of the switching groove 36, the pressure medium pressure has also dropped in the pressure chamber 40' of the bypass valve 7 of chain B, whereupon the slide valve 71 is moved or shifted toward the right by means of the spring 73. Accordingly, the two pressure chambers 18 and 18' of the fluid motor 6 of chain B are in direct communication via the switching grooves 39' amd 39. The working piston 61 of the fluid motor 6 of the faulty chain B is therefore freely movable and not hydraulically blocked. The working piston 61 of the fluid motor 6 can continue to move toward the right in accordance with the order given by the pilot. The rod 92 of the position return 9' is displaced in proportion to the displacement of the working piston 61 of the fluid motor 6 and acts upon the jet pipe 11 of the preliminary control or servo valves 1 of both chains A and B.

In order that, during jamming of the slide valve 21 in the sliding sleeve 23 of either chain A or chain B, the entire regulating system will not be blocked, the sliding sleeve 23 is axially displaceably positioned in the stationary housing with the slide valve 21 of chains A and B against the action of the springs 24. When, therefore, the frictional force between the slide valve 21 and the sliding sleeve 23 of one of the chains A or B becomes greater than the centering force of the compression springs 24 of the main control valve 2, this sliding sleeve 23 will move jointly with the slide valve 21. The faultless or error-free chain continues at that time to operate normally without interruption, whereas the faulty chain will establish, via the switching grooves 45 and 46 or 47 in the sliding sleeve 23 and the stationary housing, communication between the pressure medium supply 95 and the return 96.

The centering springs 33 of the differential pressure valve 3 are so strongly dimensioned that the slide valves 21 will not be shifted or displaced from the neutral position thereof as a result of the minor pressure differences resulting during the normal operation of the system (or minor electrical input signal differences which may be present at that time). By virtue of the interior return 94, the jet pipe 11 of the faulty chain B is shifted or displaced oppositely with regard to the movement of the jet pipe 11 of the chain A, the operable chain. As a result, a pressure difference in the main control valve 2 of the operable chain A counteracts the movement of the slide valves 21. This movement will come to a standstill when the oppositely acting pressure differencies in both chains A and B are identical. The pressure differences referred to herein are greater than the pressure differences arising during normal operation because the jet pipes 11 are not returned to the central position via the returns 914 between the preliminary control or servo valve 1 and the main control valve 2, as is the case during normal operation. The large pressure difference has the effect that the differential pressure valves 3 of both chains A and B are moved in opposite directions with respect to one another.

In FIG. 2, the same structural components are present for chain A and for chain B as are shown in FIG. 1, and the same reference numerals have been employed for these like structural components.

The difference between the construction of FIG. 1 and that of FIG. 2 is that, in FIG. 2, the slide valve 31 of the differential pressure valve 3 of chain A and the slide valve 31 of the differential pressure valve 3 of chain B are rigidly connected via a piston rod 32. This provision has the advantage that only one compression spring 33 is required at the other ends of each of the slide valves 31 of chains A and B for purposes of centering the slide valves 31. The piston rod 32 of both slide valves 31 projects beyond the outer ends of the slide valves and the piston rod ends are provided with locking grooves or notches 34. It is possible to bring locking or checking pins 83 of a blocking means 8 in chain A and chain B into meshing engagement in these grooves or notches 34. The blocking means 8 contains a piston 81 which is displaceably disposed within a cylinder and is oved into the unblocked position against the action of a compression spring 82. Provided for this purpose is a pressure chamber 80 which is in constant communication, via a pressure line 80′, with the pressure medium supply line 17′, which, in turn, is in communication with the pressure source 95. In case of a drop of the pressure medium pressure in line 17′, the piston 81 is so displaced or shifted due to the action of the compression springs 82 that the checking pins 83 engage in the blocking or locking grooves or notches 34 of the slide valves 31 of the differential pressure valves 3 of both chains A and B.

The differential pressure valves 3 are acted upon by the pressure medium pressure, in the construction according to FIG. 2, as are the main control valves 2 of chains A and B. The differential pressure valves 3 are so connected to the main control valves 2 that the pressure differences which act on the main control valves 2 in the same direction are here operative opposite each other; i.e., during normal operation, forces act upon the differential pressure valves 3, which are identical but act in an opposite fashion, and thus cancel each other out. In order that, in case of small signal differences at the torque motors 12 of the preliminary control or servo valves 1, the slightly varying forces due to the pressure medium pressure cannot effect a movement of the differential pressure valves 3, the compression springs 33 are inserted into the housing with a corresponding prestress. The central position of the differential pressure valves 3 is maintained by virtue of this aforementioned prestress force of the compression springs 33 at slight differences. In case of zero signal, i.e., in case of the interruption of, for example, the current supply to the torque motors 12 in one of chains A or B, there will prevail in the cylinder spaces or chambers 14 and 14′ of the main control valves 2 oppositely acting pressure differences. This results for the differential pressure valves 3 in forces acting in the same direction. As a consequence thereof, the slide valves 31 of the differential pressure valves 3 are shifted or displaced. The direction of movement of the slide valves 31 depends upon the position of the working pistons 61, and upon which chain the error arises in. By means of the position valve 4 of chain A and chain B, a disconnecting signal is allowed to pass only from the faulty chain, as has already been described hereinbefore in connection with the construction according to FIG. 1. Due to the disconnection of the pressure medium in the faulty chain, the blocking means 8 for the differential pressure valve 3 of the faulty chain is actuated. The slide valves 31 of the differential pressure valves 3 are maintained in the central position by means of the locking or checking pin 83 engaging in the locking grooves or notches 34 thereof. The blocking means 8 are necessary because the equilibrium at the differential pressure valves 3 is disturbed as a consequence of the disconnection of one of chains A or B, and otherwise the operable chain would also be disconnected.

It will be obvious to those skilled in the art that many modifications may be made within the scope of the present invention without departing from the spirit thereof, and the invention includes all such modifications.

What is claimed is:

1. A redundant electrohydraulic regulating system for actuating control surfaces, rudders and the like in aircraft, wherein the electrohydraulic regulating system comprises two servo chains for detecting errors, each of said servo chains including a preliminary control valve actuatable by means of electrical input signals; a main control valve, having a distributing piston valve displaceable in response to the operation of said preliminary control valve; a fluid motor having pressure chambers and a piston, said piston being displaced by a supplied pressure medium whose pressure is controlled by said displacement of said distributing piston valve of said main control valve; a position valve, having a distributing slide valve which is mechanically coupled to the piston of said fluid motor and a differential pressure valve, which is actuated by said preliminary control valve and, in conjunction with said piston valve, interrupts the supply of said pressure medium to the said pressure chambers of said fluid motor of a faulty servo chain.

2. A regulating system according to claim 1 wherein the differential pressure valve comprises an axially displaceable piston, which is retained in the central position thereof by means of compression springs.

3. A regulating system according to claim 1 which additionally includes a disconnecting valve, for giving a disconnecting signal hydraulically, in each of the servo chains.

4. A regulating system according to claim 1 which additionally includes mechanical coupling means coupling the position valve of one servo chain with the position valve of a second servo chain.

5. A regulating system according to claim 1 wherein the differential pressure valve of each servo chain includes an axially displaceable piston and a compression spring at the outwardly-positioned end of said piston, and the regulating system additionally includes mechanical coupling means coupling the inwardly-positioned end of said piston of said differential pressure valve of one servo chain with the inwardly-positioned end of said piston of said differential pressure valve of a second servo chain.

* * * * *

UNITED STATES PATENT OFFICE
CERTIFICATE OF CORRECTION

Patent No. 3,837,262      Dated September 24, 1974

Inventor(s) Dieter Hedermann

It is certified that error appears in the above-identified patent and that said Letters Patent are hereby corrected as shown below:

Line 2 of item 73 "Friedrichshafer/Bodensel" should read - - - Friedrichshafen/Bodensee - - -.

Line 10 of the Abstract, "servro" should read - - - servo - - -.

Column 1, line 51, "tO" should read - - - to - - -.

Column 2, line 48, "tranversed" should read - - - traversed - - -; line 50, "Out" should read - - - out - - -.

Column 3, line 17, after "displaceable", - - - distributing - - - should appear.

Column 4, line 49, "layer" should read - - - lever; line 56, after "of", - - - a - - - should appear; "preselected" should read -- prestressed Column 5, line 2, "conconnected" should read - - - connected - - -; line 66, - - - passes - - - should appear after "medium".

Column 6, line 8, "presetresed" should read - - - prestressed - - -; line 9, "52" should read - - - 51 - - -; Line 15, "presence" should read - - - pressure - - -

Column 7, line 25, "914" should read - - - 94 - - -; line 41, "other" should read - - - outer - - -; line 51, "oved" should read - - - moved - - -.

Column 8, line 15, - - - signal - - - should appear after "slight"; line 15, - - - a - - - should appear after "of"; line 64, "piston" should read - - - position - - -.

Signed and sealed this 17th day of December 1974.

(SEAL)
Attest:

McCOY M. GIBSON JR.
Attesting Officer

C. MARSHALL DANN
Commissioner of Patents